United States Patent
Bradley et al.

(10) Patent No.: US 9,764,850 B2
(45) Date of Patent: Sep. 19, 2017

(54) EDGE SEAL FOR FIBRE-REINFORCED COMPOSITE STRUCTURE

(75) Inventors: Jeremy Peter Bradley, Bristol (GB);
David Alistair Sutton, Bristol (GB);
Colin John West, Pontypridd (GB);
Andrew Withers, Sheepway (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 2089 days.

(21) Appl. No.: 12/762,743

(22) Filed: Apr. 19, 2010

(65) Prior Publication Data

US 2010/0264274 A1 Oct. 21, 2010

(30) Foreign Application Priority Data

Apr. 20, 2009 (GB) .................................. 0906686.1

(51) Int. Cl.
| | | |
|---|---|---|
| B64D 37/02 | (2006.01) | |
| B32B 3/26 | (2006.01) | |
| B32B 7/12 | (2006.01) | |
| B64D 45/02 | (2006.01) | |

(52) U.S. Cl.
CPC ............... B64D 37/02 (2013.01); B32B 3/26 (2013.01); B32B 7/12 (2013.01); B64D 45/02 (2013.01); *Y10T 156/10* (2015.01); *Y10T 156/1052* (2015.01); *Y10T 428/249995* (2015.04); *Y10T 428/31504* (2015.04)

(58) Field of Classification Search
CPC ...................................................... B64D 37/02
USPC ...................................................... 244/135 R
See application file for complete search history.

(56) References Cited

U.S. PATENT DOCUMENTS

| 1,386,791 | A | | 8/1921 | Murdock | |
|---|---|---|---|---|---|
| 2,417,961 | A | * | 3/1947 | Wiley | ................... A47B 17/00 248/345.1 |
| 2,446,815 | A | | 8/1948 | Davies et al. | |
| 3,869,106 | A | * | 3/1975 | Gregov | ................ A47B 95/043 108/27 |
| 4,256,790 | A | * | 3/1981 | Lackman et al. | ............... 428/73 |
| 4,331,723 | A | * | 5/1982 | Hamm | ............................ 428/61 |
| 4,492,607 | A | * | 1/1985 | Halcomb | ........................ 156/242 |
| 5,479,864 | A | * | 1/1996 | Kemp | .................. A47B 13/083 108/27 |

(Continued)

FOREIGN PATENT DOCUMENTS

| DE | 4107222 A1 | 4/1992 |
|---|---|---|
| GB | 788063 | 12/1957 |

(Continued)

OTHER PUBLICATIONS

US 7,185,581, 03/2007, Johnson (withdrawn)
British Search Report for GB0906686.1 dated Oct. 27, 2009.
British Search Report for GB0906686.1 dated Mar. 25, 2010.

*Primary Examiner* — Justin Benedik
(74) *Attorney, Agent, or Firm* — Hauptman Ham LLP

(57) ABSTRACT

A fiber-reinforced composite structure includes a cut edge; an elastomeric cap covering the cut edge; and an adhesive sealant bonding the elastomeric cap to the cut edge. The fiber-reinforced composite structure is joined to a component and the elastomeric cap includes a generally Z or L-shaped cap with a web bonded to the cut edge of the fiber-reinforced structure and a flange bonded to the component and extending away from the fiber-reinforced structure.

30 Claims, 17 Drawing Sheets

(56) References Cited

U.S. PATENT DOCUMENTS

| | | | |
|---|---|---|---|
| 6,298,501 B1 * | 10/2001 | Beichner | A47K 3/001 108/150 |
| 6,391,246 B2 * | 5/2002 | Shiraishi et al. | 264/510 |
| 6,532,708 B1 * | 3/2003 | Baerveldt | 52/396.05 |
| 6,662,515 B2 | 12/2003 | Buhrts et al. | |
| 6,722,097 B2 | 4/2004 | Haslem et al. | |
| 6,786,452 B2 * | 9/2004 | Yamashita et al. | 244/123.1 |
| 7,100,492 B2 | 9/2006 | Fish | |
| 8,096,092 B2 * | 1/2012 | Vichniakov | 52/588.1 |
| 2002/0031641 A1 * | 3/2002 | George et al. | 428/105 |
| 2008/0128430 A1 * | 6/2008 | Kovach et al. | 220/586 |

FOREIGN PATENT DOCUMENTS

| | | |
|---|---|---|
| GB | 1149471 | 4/1969 |
| GB | 2359604 A | 8/2001 |
| WO | 03006757 A2 | 1/2003 |
| WO | 2006014919 A1 | 2/2006 |

* cited by examiner

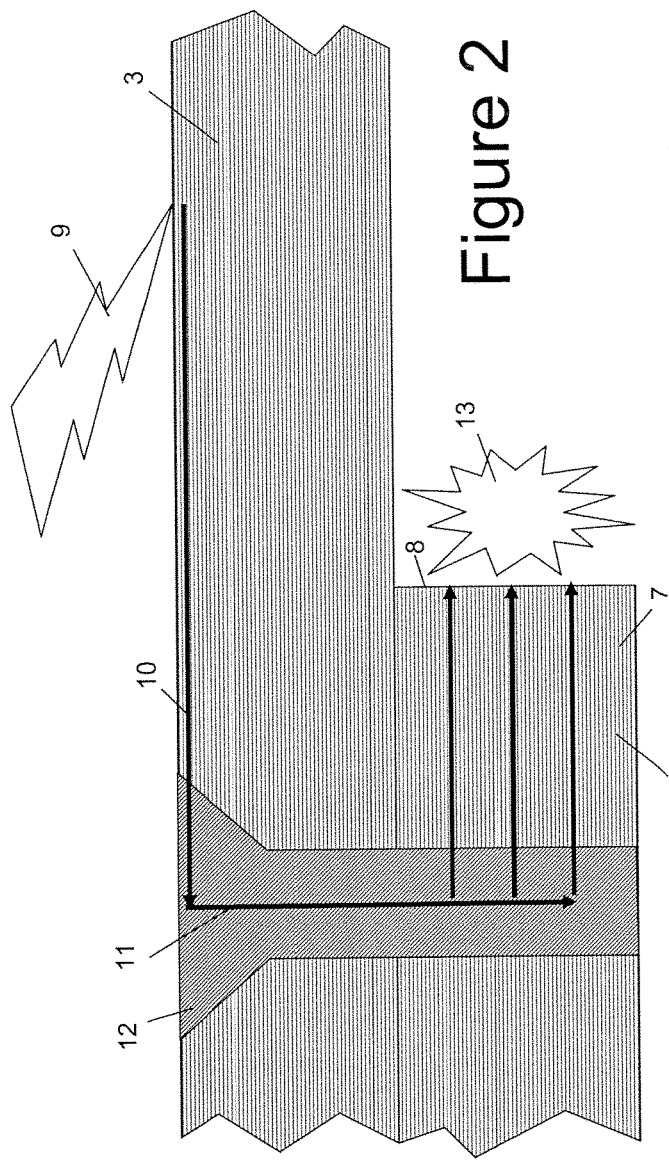
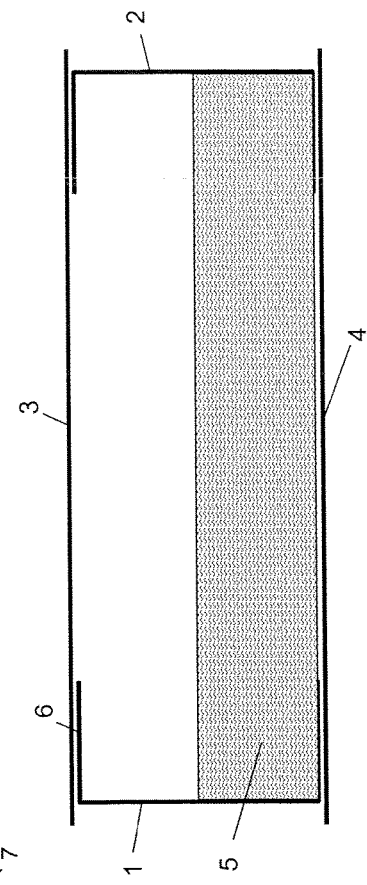
Figure 1
Figure 2

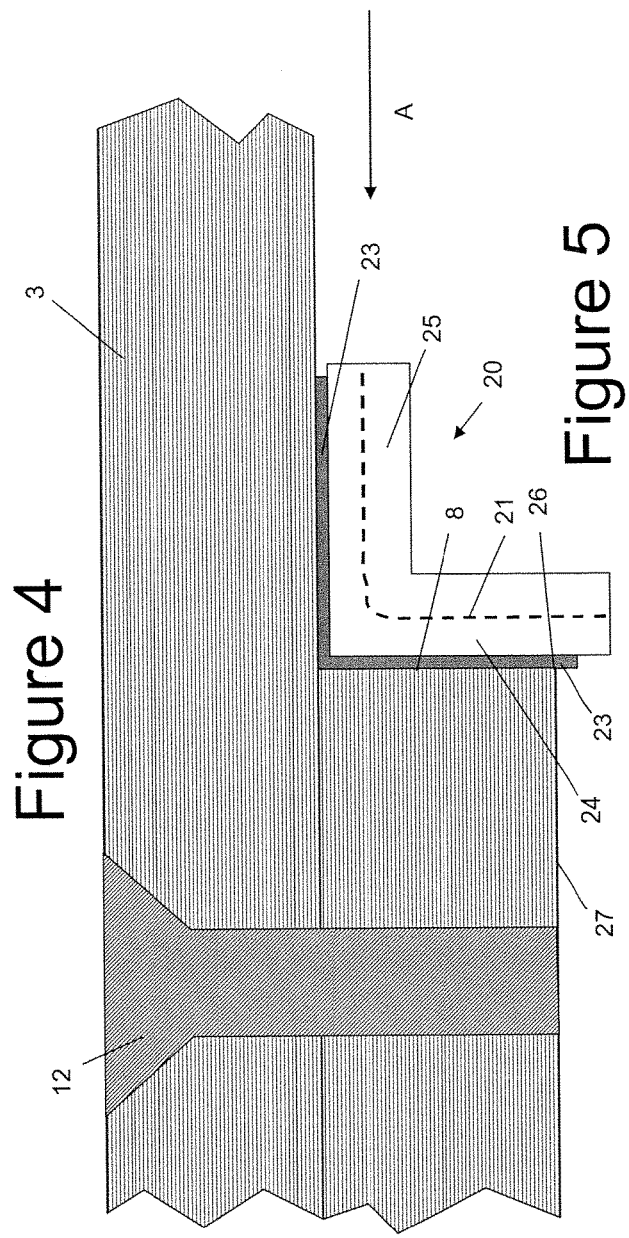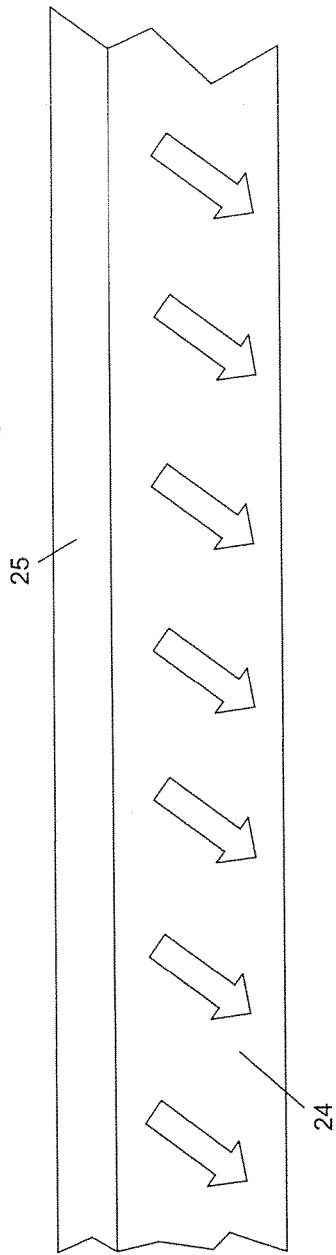

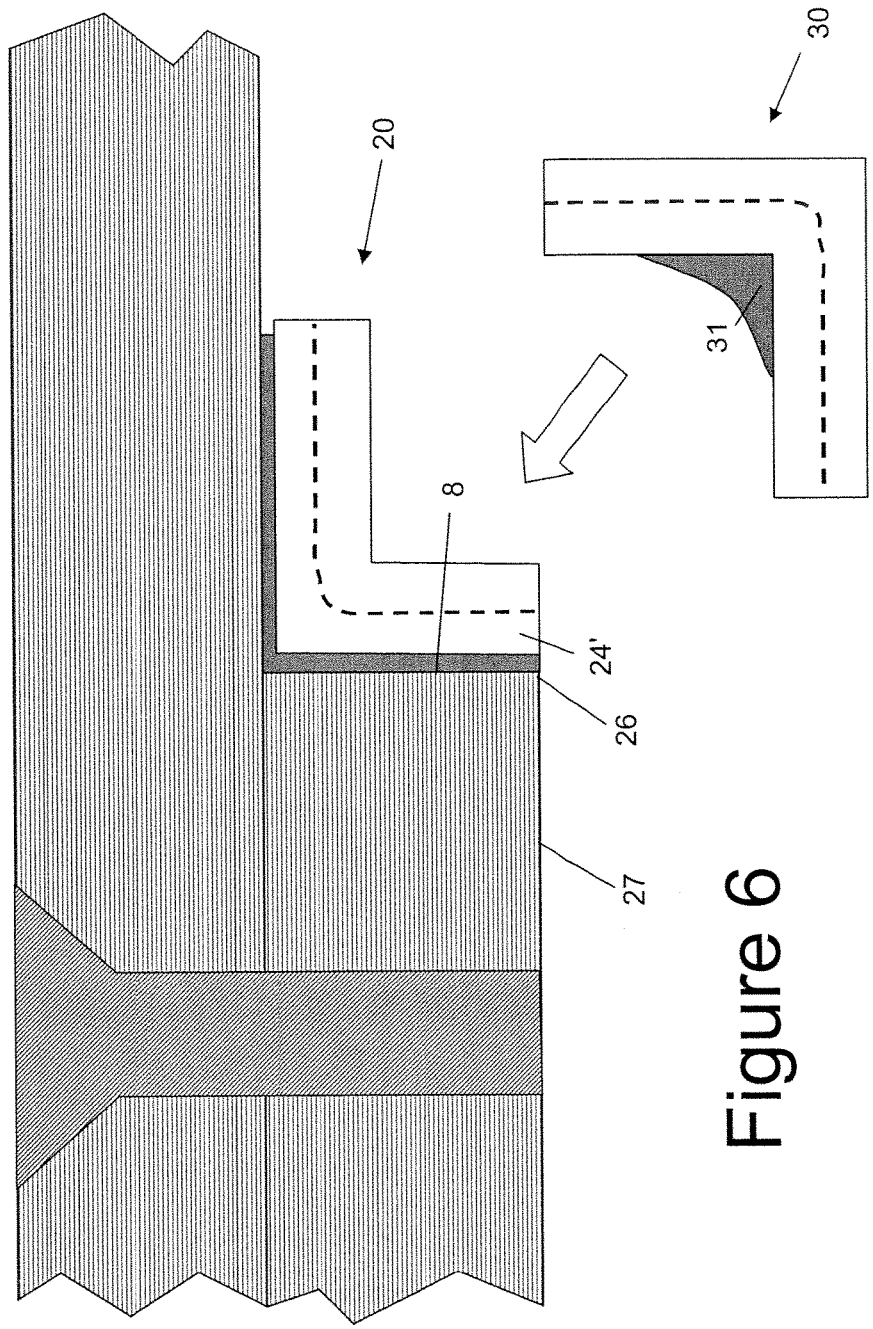

EDGE SEAL FOR FIBRE-REINFORCED COMPOSITE STRUCTURE

RELATED APPLICATIONS

The present application is based on, and claims priority from, British Application Number 0906686.1 filed Apr. 20, 2009, the disclosure of which is hereby incorporated by reference herein in its entirety.

FIELD OF THE INVENTION

The present invention relates to an edge seal for inhibiting edge glow in a fibre-reinforced composite structure

BACKGROUND OF THE INVENTION

FIG. 1 is a schematic cross-sectional view through an aircraft wing box. The wing box has a pair of C-section spars 1, 2 and upper and lower covers 3, 4 which define the walls of a fuel tank containing fuel 5. FIG. 2 shows in detail the joint between a cap 6 of the spar 1 and the upper cover 3.

The spar cap 6 is formed from a series of plies of carbon fibre-reinforced epoxy resin. Each ply comprises a plurality of uni-directional carbon fibres impregnated with an epoxy resin matrix material. Some of the layers of carbon fibre 7 are shown in FIG. 2, and these fibres terminate at a cut edge 8. If a lightning strike 9 hits the upper cover 3, then current 10 tends to run along a bronze mesh (not shown) on the external surface of the cover 3, down the metal fasteners 12 which join the spar cap to the cover, and along the carbon fibre layers in the spar cap 6 up to the cut edge 8 which is a potential source of edge glow 13. Note that the epoxy resin between the fibres is highly resistive so current tends not to flow between adjacent plies of the composite material.

One solution to the problem of edge glow is presented in US2008/0128430. The cut laminate edge is sealed with an edge seal produced from a prepreg form using a thermosetting resin matched to the characteristics of the resin used in the laminate. The prepreg form can be applied to the cut laminate edge either before or after the laminate is cured, optionally with an epoxy film adhesive. The edge seal acts as a dielectric layer that both electrically insulates the cut laminate edge from the fuel and mechanically contains energetic particles produced at the edge due to lightning strikes or other sources of electrical charges.

A number of possible problems have been identified with the solution presented in US2008/0128430. Firstly the prepreg material which forms the edge seal is relatively brittle and, as such, there is a risk that it may shatter in the event of a lightning strike. Specifically, a lightning strike can result in the generation of high pressure gasses and/or plasma at the cut edge which may have the potential to shatter the relatively brittle edge seal. Secondly the bond between the prepreg material and the cut edge is relatively brittle, so the gasses and/or plasma may have the potential to cause the bond to shatter. Finally the U-shaped cross-sectional profile of the edge seal means that it is difficult to join the laminate to another component. Specifically: a) a joggle or cut-out must be formed in the laminate or the other component in order to accommodate one flange of the edge seal which is sandwiched between them; and b) the edge seal cannot be fitted after the laminate has been joined to the other component. Also, it is difficult to remove and replace the edge seal for inspection or repair purposes. This is because it is necessary to dismantle the joint in order to remove the seal, and because the nature of the adhesive bond between the cut edge and the prepreg makes it physically difficult to break.

SUMMARY OF THE INVENTION

A first aspect of the invention provides a fibre-reinforced composite structure comprising a cut edge; an elastomeric cap covering the cut edge; and an adhesive sealant bonding the elastomeric cap to the cut edge.

A second aspect of the invention provides a method of inhibiting edge glow in a fibre-reinforced composite structure comprising a cut edge, the method comprising bonding an elastomeric cap to the cut edge with an adhesive sealant.

The use of an elastomeric material in the cap has the advantage that it provides a degree of physical flexibility and resilience which enables the cap to mechanically contain energetic particles produced at the edge without shattering. Also, the elastomer can be cured and/or moulded into shape before the cap is applied to the cut edge, in contrast to the prepreg material in US2008/0128430 which must be cured after it is applied in order to bond it to the cut edge. Also, the flexibility of the elastomeric material forming the cap makes it easier to peel the cap off the edge for inspection or repair purposes.

Preferably the structure comprises a plurality of fibres, most typically carbon fibres, which terminate at the cut edge.

The structure may comprise a series of plies of fibre-reinforced composite material, each ply comprising a plurality of fibres which terminate at the cut edge.

Typically the structure comprises a matrix material between the fibres which is more electrically resistive than the fibres. For example the matrix material may be an epoxy resin or other highly resistive matrix material.

Preferably the adhesive sealant also comprises an elastomeric material, thus providing an additional degree of flexibility and resilience. The use of an elastomeric adhesive sealant in combination with an elastomeric cap also makes it particularly easy to peel the cap off the edge for inspection or repair purposes because the elastomeric adhesive sealant breaks by cohesive failure as the cap is peeled off.

Preferably, the elongation at break of the elastomeric material forming the cap is greater than 200%. That is, if the elastomer has a length L at rest, its length at break is preferably greater than 3 L. The same is preferably also true for the elastomeric material forming the adhesive sealant.

The elastomeric cap may be un-reinforced, but more preferably it comprises a reinforced elastomer, reinforced with a material such as glass fabric.

The adhesive sealant may be a film adhesive, but more preferably it is a wet adhesive sealant. A wet adhesive sealant is preferred because air bubbles can be squeezed out of the wet adhesive sealant before it cures. The wet adhesive sealant may by provided in the form of a film, or the wet adhesive sealant may impregnate a foam layer between the elastomeric cap and the cut edge. Preferably the foam layer is in compression to prevent voids being present.

A further aspect of the invention provides a joint comprising a fibre-reinforced composite structure with a cut edge; a component joined to the fibre-reinforced composite structure; and a cap with a web bonded to the cut edge of the fibre-reinforced composite structure and a flange bonded to the component and extending away from the fibre-reinforced structure.

The cap in accordance with the further aspect of the invention is easy to remove and replace for inspection or repair purposes. Furthermore the joint is simple because there is no need to form a recess or joggle to make space for the flange of the cap.

The joint is preferably manufactured by joining the component to the fibre-reinforced composite structure; bonding the web of the cap to the cut edge of the fibre-reinforced composite structure after the component has been joined to the fibre-reinforced structure; and bonding the flange of the cap to the component after the component has been joined to the fibre-reinforced structure.

Preferably, the cap is formed from a dielectric material such as an elastomer as described above in relation to the first aspect of the invention, or prepreg as described for example in US2008/0128430.

The cap may be bonded directly to the cut edge and the component by co-bonding or co-curing, but more preferably the cap is bonded to the cut edge and the component by secondary bonding via an adhesive sealant as in the first aspect of the invention.

Advantageously the fibre-reinforced composite structure has an inner face which faces the component and an outer face which is opposite the inner face, and the web of the cap has a cut edge which is substantially flush with the outer face of the fibre-reinforced composite structure. In this case the web of the cap can be cut to size along a corner of the cut edge of the fibre-reinforced composite structure after the web of the cap has been attached to the cut edge.

The cap may have a generally Z-shaped sectional profile with a web bonded to the cut edge of the fibre-reinforced structure, a first flange bonded to the component and extending away from the fibre-reinforced structure, and a second flange bonded to the fibre-reinforced composite structure. Alternatively the cap may have a generally L-shaped sectional profile with a single flange only.

Advantageously the web of the cap is formed integrally with the flange of the cap, although alternatively the cap may comprise an assembly of parts in which the web and flange are separately formed and bonded with each other.

Advantageously the cap comprises a cap assembly with an inner cap part bonded to the cut edge of the fibre-reinforced structure; and an outer cap part with a web bonded to the web of the inner cap part and a flange bonded to the fibre-reinforced composite structure. The outer cap part provides an element of redundancy, protects the inner cap part from mechanical damage, and inhibits peel failure between the inner cap part and the cut edge. In this case the inner cap part may be simply a web strip with no flange (in which case the flange bonded to the component may be part of the outer cap part) or the inner cap part may have a web bonded to the cut edge of the fibre-reinforced structure and a flange bonded to the component. Optionally the inner cap part may be formed from a softer elastomeric material than the outer cap part.

The invention is of particular use in an aircraft, since an aircraft is particularly susceptible to edge glow during a lightning strike. The invention is also of particular use in a fuel tank, typically (although not exclusively) an aircraft fuel tank.

Further preferred features of the present invention are set out in the dependent claims.

BRIEF DESCRIPTION OF THE DRAWINGS

Embodiments of the invention will now be described with reference to the accompanying drawings, in which:

FIG. 1 is a sectional view of a fuel tank in an aircraft wing;

FIG. 2 is a sectional view of a joint between a spar cap and an upper cover;

FIGS. 3-9 show a first method of attaching a seal which inhibits edge glow in the joint of FIG. 2;

DETAILED DESCRIPTION OF EMBODIMENT(S)

Figure 3:
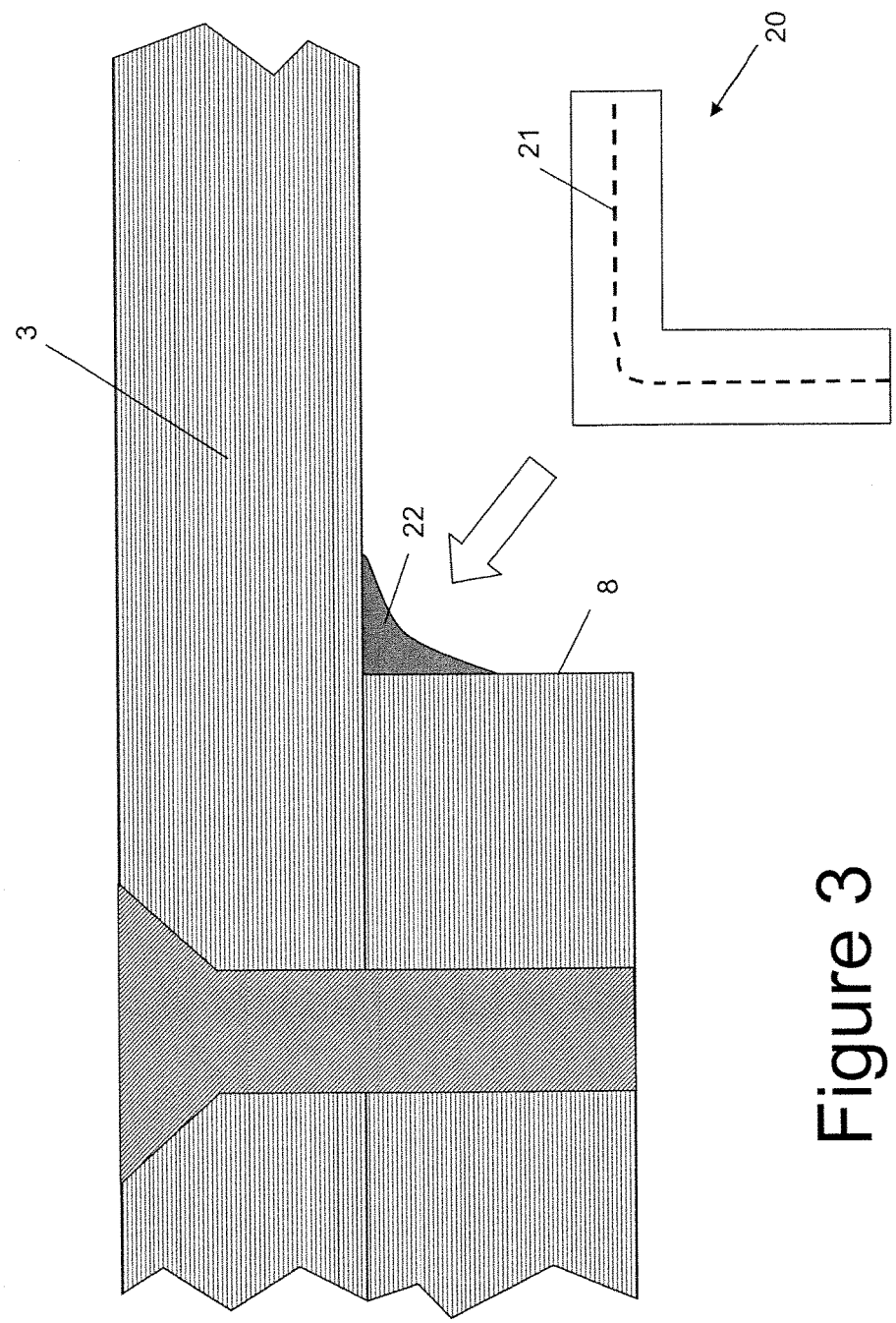

FIGS. 3-9 show a first method of attaching a seal which inhibits edge glow in the joint of FIG. 2, and the same reference numerals will be used for identical features. Referring to FIG. 3, a moulded elastomeric cap 20 is manufactured by placing an elastomeric material in a mould along with a fabric fibre reinforcement layer 21. The cap is then heated in the mould to cure the elastomeric material so that it retains its L-shaped cross-sectional profile. Suitable elastomeric materials for forming the cap 20 include fluorosilicone, silicone, polyurethane, or acrylonitrile butadiene rubber, or PR2001 (a polysulphide sealant). The reinforcement layer 21 adds strength and stiffness to the elastomeric material. Suitable materials for the fabric reinforcement layer 21 include glass, or any other non-conductive material such as polyester, para-aramid, meta-aramid, or ceramic. As an alternative to moulding, the elastomeric cap 20 could be extruded. Furthermore, the reinforcement layer 21 may be omitted if it is not necessary.

A strip of wet polysulphide sealant 22 shown in FIG. 3 is then applied to the corner where the cut edge 8 meets the cover 3 with a nozzle, and the cap 20 is pushed into place, causing the strip 22 of wet sealant to spread out into a thin layer 23 as shown in FIG. 4, contacting and covering the full extent of the cut edge, including the carbon fibres which terminate at the cut edge. Then pressure is applied to the elastomeric cap in a series of strokes with a tool so as to squeeze air bubbles out of the adhesive sealant. FIG. 5, which is a view taken in the direction A indicated in FIG. 4, shows arrows illustrating how a series of such strokes can be applied to the web 24 of the cap, and a similar series of strokes can be applied to the flange 25 of the cap.

The sealant layer 23 then cures at room temperature to bond the web 24 of the cap to the cut edge 8 and the flange 25 of the cap to the cover 3. The flange 25 extends away from the web 24 towards the right (that is, away from the spar cap) and remains accessible after installation.

Optionally the web 24 of the cap may be formed from a softer elastomeric material than the flange 25 of the cap.

Suitable sealant materials include PR2001, Scotchseal™ 560 or 540 adhesive sealant, or a two-part polyurethane adhesive containing an isocyanate and a urethane oligomer. PR2001 is a PPG Aerospace, PRC De-Soto product and comes in a number of different grades. All are suitable.

The spar cap has an inner face (not labelled) which faces the cover and an outer face 27 which is opposite the inner face. After the sealant layer has cured, the protruding part of the web 24 is cut away by cutting along the corner 26 where the cut edge 8 meets the outer face 27 of the spar cap to leave a trimmed web 24' as shown in FIG. 6 which is substantially flush with the outer face 27 of the spar cap. Note that the thickness of the cut edge 8 may vary in a span-wise direction along the wing (that is, in a direction normal to the cross-sections shown in the drawings) and cutting the web 24 to size in situ enables the length of the trimmed web 24' to taper accordingly.

Figure 7:
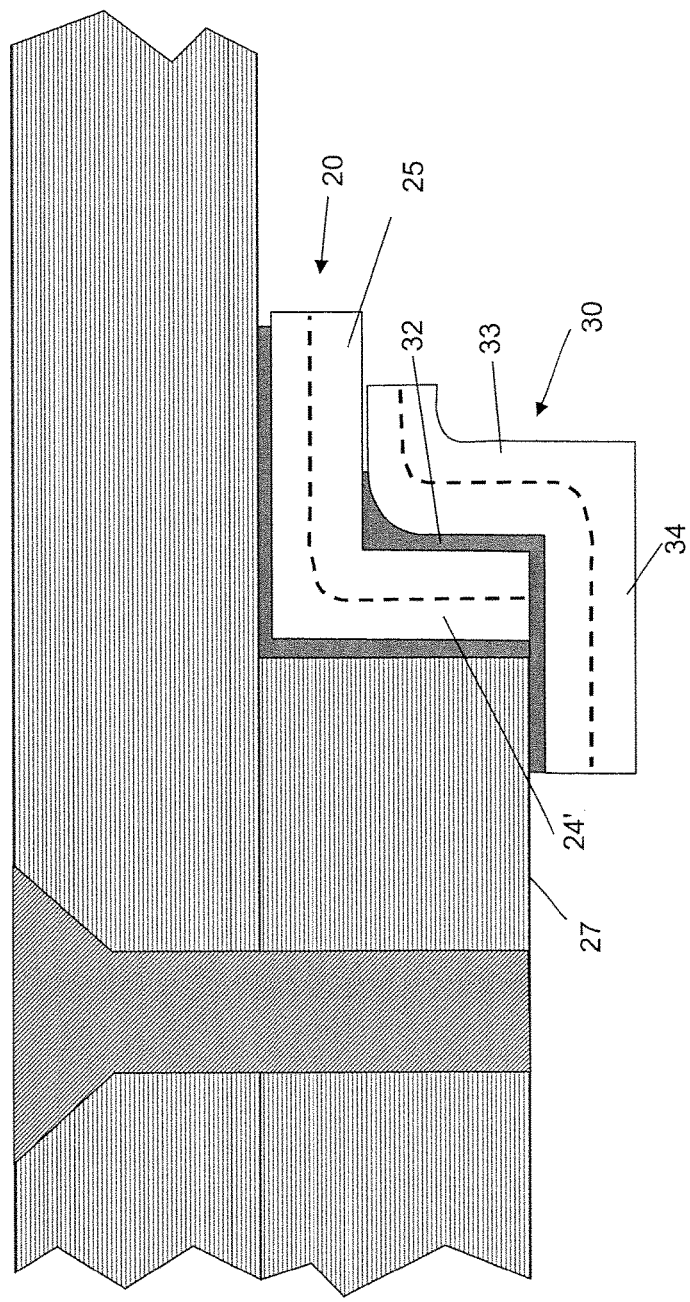

Optionally the process may be stopped at the point shown in FIG. 6, leaving just a single L-shaped cap in place, but more preferably an L-shaped outer cap part 30 is bonded to the inner cap part 20 as shown in FIGS. 6 and 7 to form a two-part generally Z-shaped cap assembly.

The outer cap part 30 is identical to the inner cap part 20, and in fact the two cap parts 20, 30 may be cut from the same length of moulded or extruded material. A strip 31 of wet polysulphide sealant shown in FIG. 6 is applied to the concave corner of the outer cap part 30 which is then pushed into place, causing the strip 31 of wet sealant to spread out into a thin layer 32 as shown in FIG. 7. Optionally pressure may also be applied to the outer cap part 30 in a series of strokes with a tool so as to squeeze air bubbles out of the adhesive sealant. The sealant layer 32 then cures at room temperature to bond the web 33 of the outer cap part to the trimmed web 24' of the inner cap part, and the flange 34 of the outer cap part to the outer face 27 of the spar cap.

The outer cap part 30 shields the inner cap part 20 from impact, preventing the inner cap being dislodged from the cut edge. In particular, if the end of the flange 34 of the outer cap is knocked, then the flange 34 may peel off but the adhesive bond between the web 24' and the cut edge 8 of the spar cap will remain intact.

Optionally the web 33 of the outer cap part may be formed from a softer elastomeric material than the flange 34.

Figure 8:
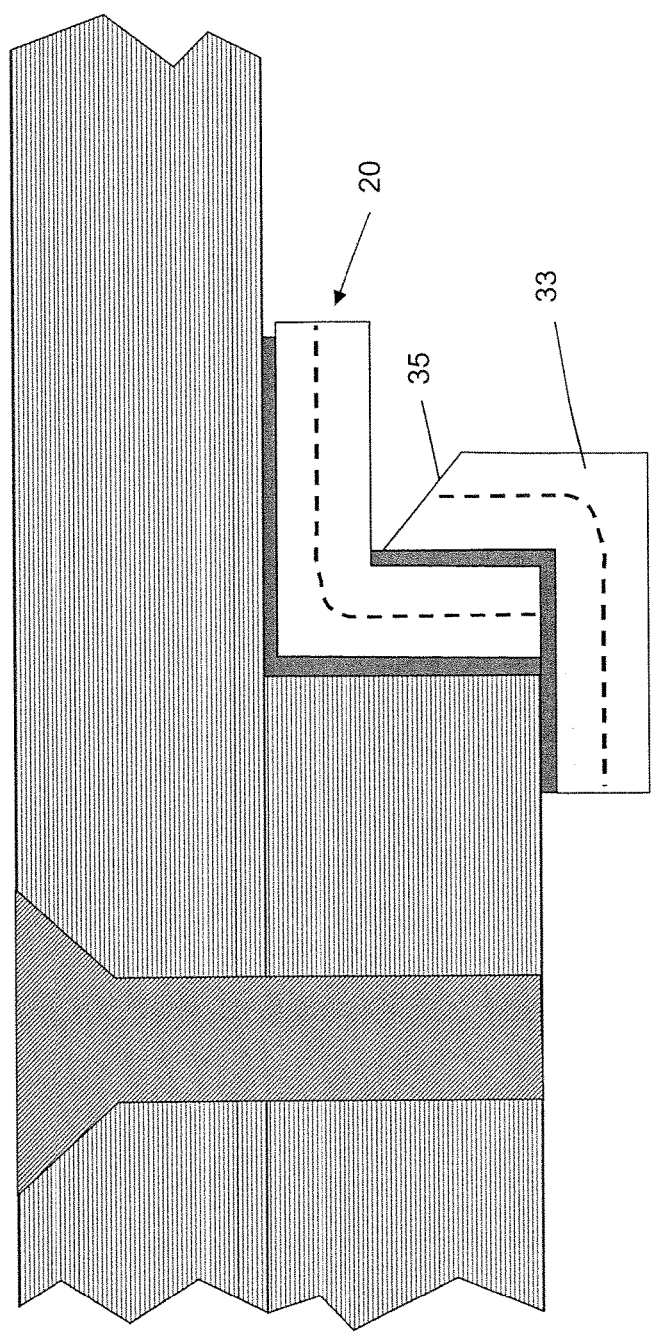

The web 33 of the outer cap part, being the same length as the untrimmed web 24 of the inner cap part, is thus longer than the trimmed web 24' and so it bends where it meets the flange 25 of the inner cap part as shown in FIG. 7. The bent portion of the web 33 is then cut away in situ with a blade to form a cut edge 35 at 45° as shown in FIG. 8. The blade is precisely of the correct length and has a shoulder guard which engages the web 33 as it cuts, preventing the blade from cutting into the inner cap part 20.

Figure 9:
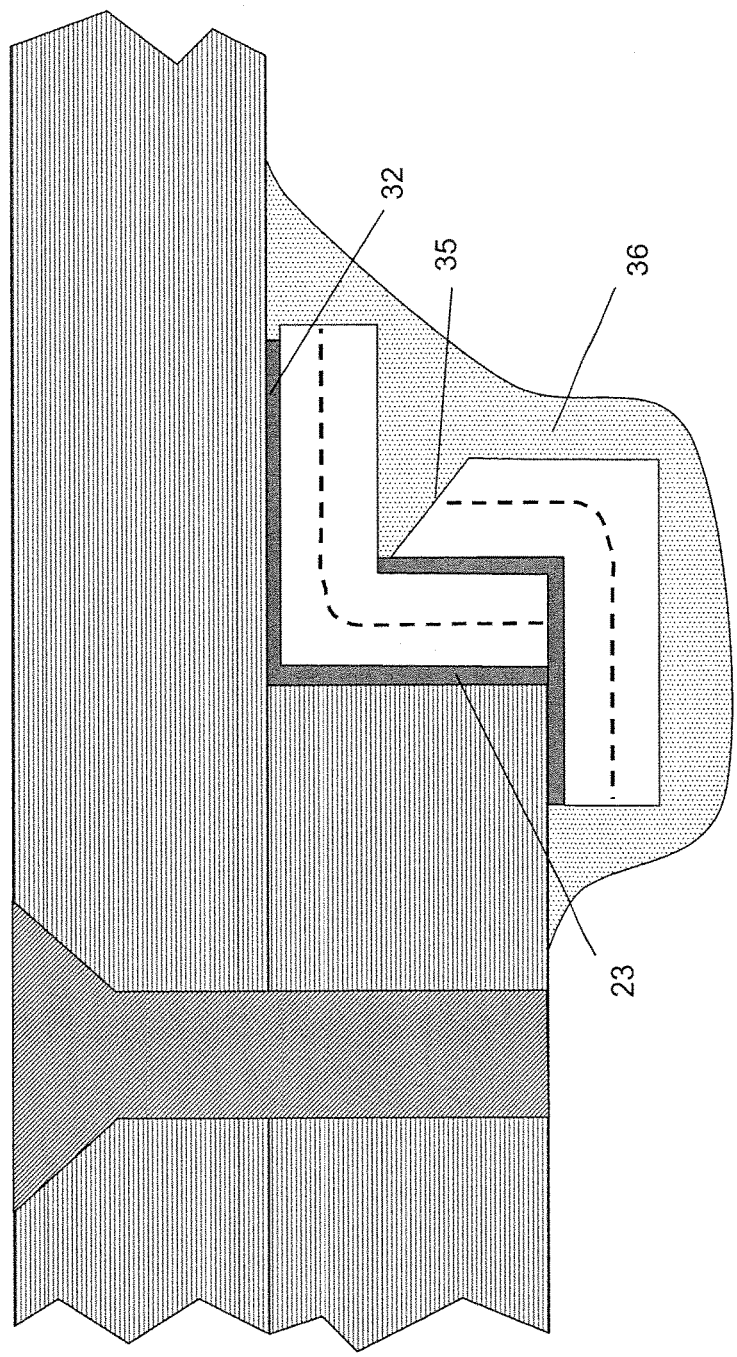

Optionally the process may be stopped at the point shown in FIG. 8, but more preferably both of the cap parts 20, 30 are encapsulated in sealant 36 as shown in FIG. 9. The sealant 36 may be formed from the same material as the adhesive sealant layers 23, 32.

Figure 10:
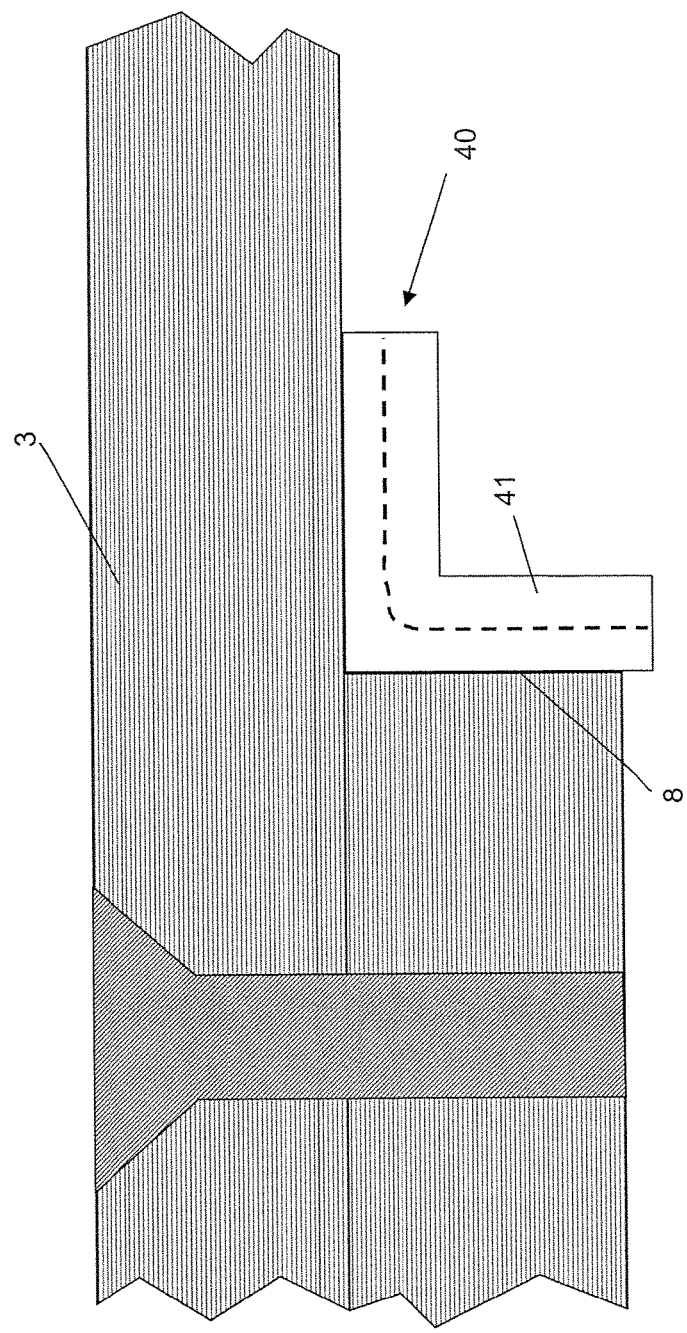
FIGS. 10-13 show a second method of attaching a seal to the cut edge.
Figure 11:
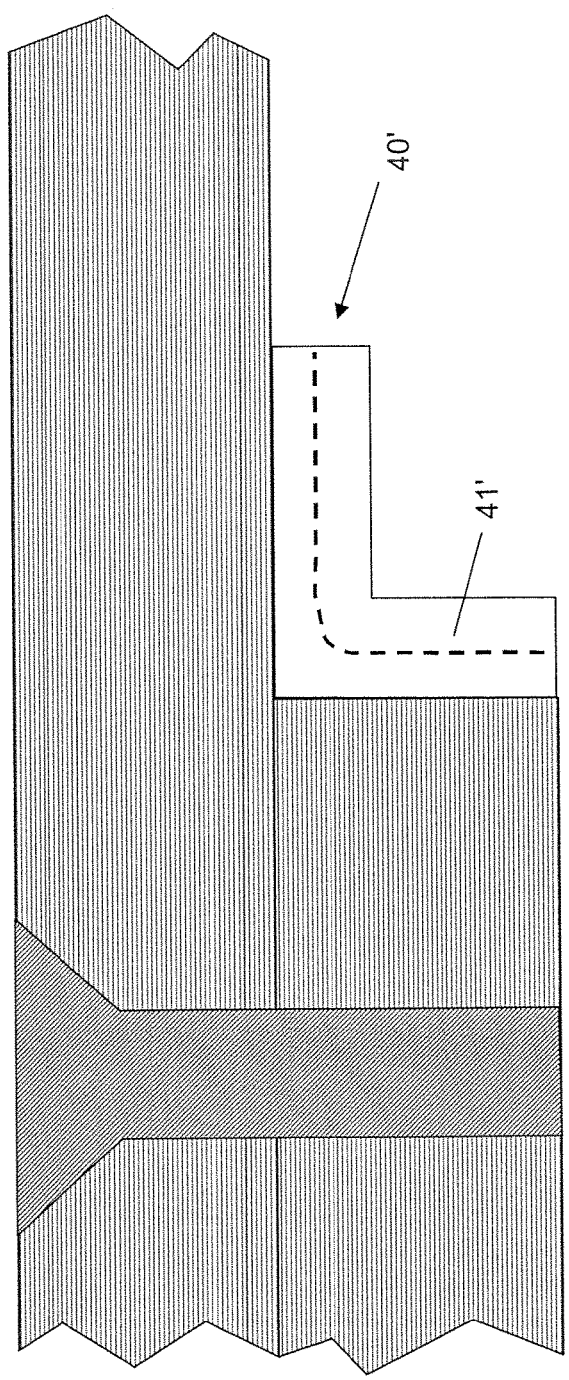

FIGS. 10-13 show a second method of sealing the cut edge 8. First, an L-shaped cap part 40 shown in FIG. 10 is held (without adhesive) in the corner where the cut edge 8 meets the cover 3, and the web 41 is cut to size to leave a trimmed cap part 40' with a trimmed web 41' shown in FIG. 11. The trimmed cap part 40' is then removed.

Figure 12:
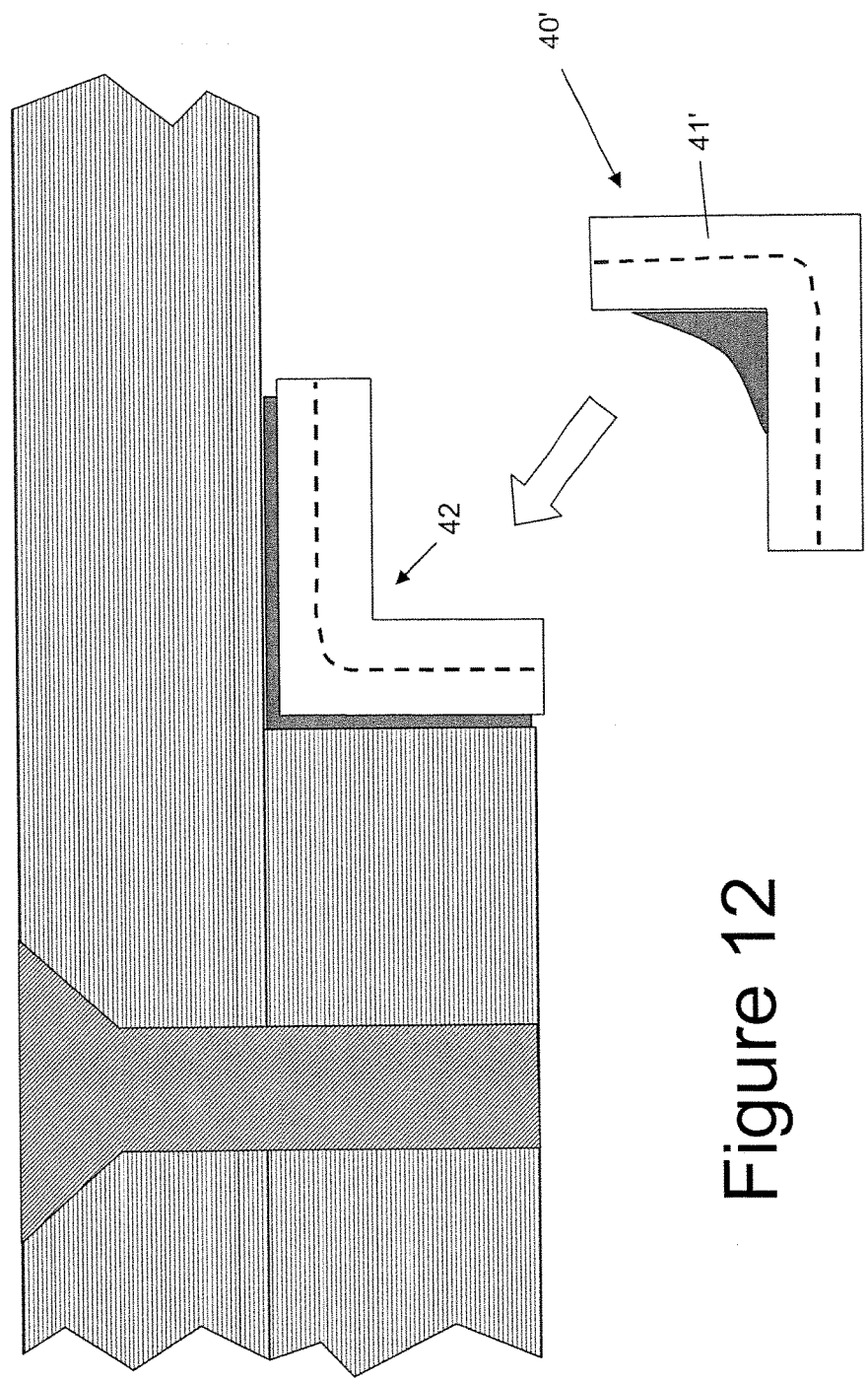
Figure 13:
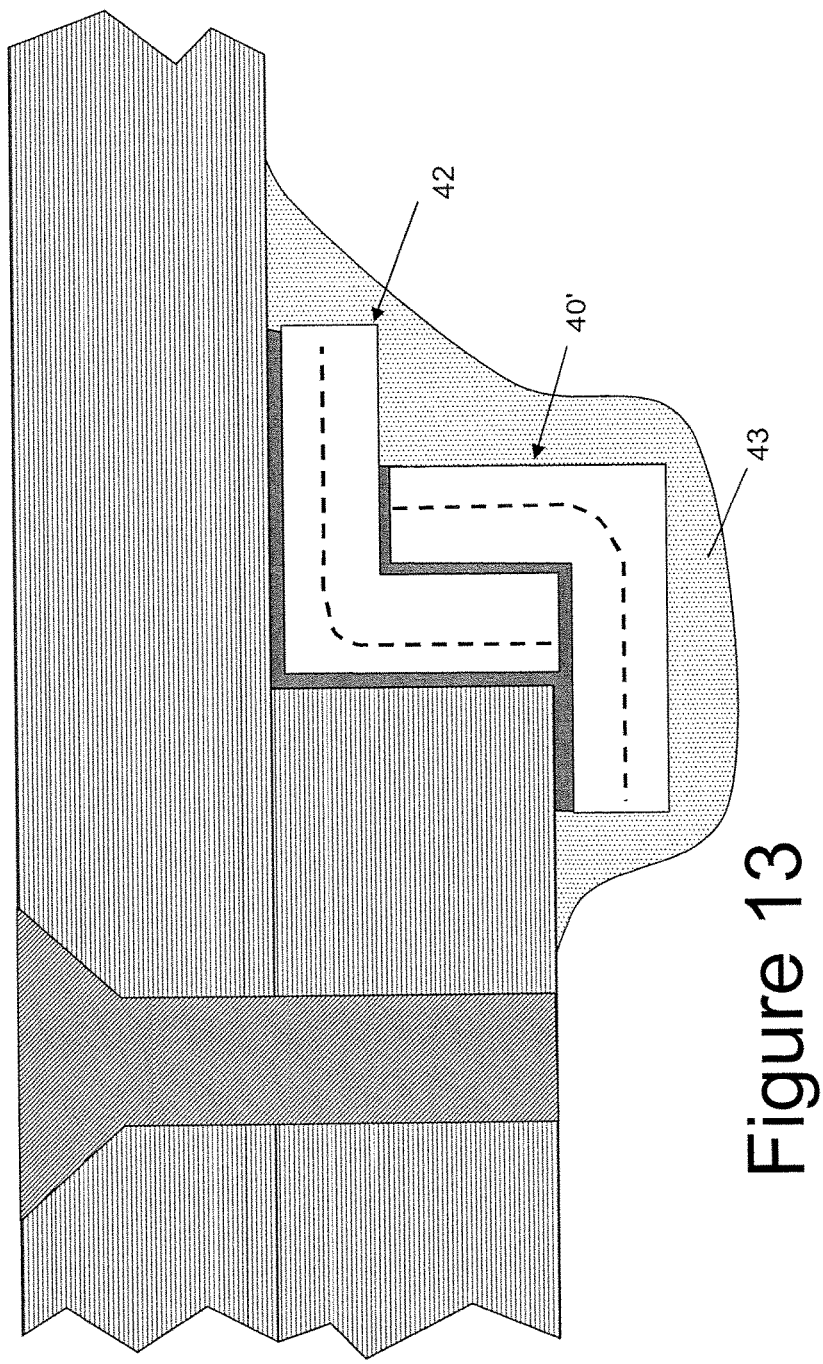

Next, an inner cap part 42 is bonded to the joint and cut to size as shown in FIG. 12, using the process described above with reference to FIGS. 2-6. The previously trimmed cap part 40' can then be bonded to the inner cap part 42 as shown in FIG. 13 to form a generally Z-shaped cap assembly without requiring it to be trimmed in situ. Optionally the cap parts may be encapsulated in sealant 43 as shown in FIG. 13.

Note that in FIGS. 6 and 12 the application of the adhesive for the outer cap parts 30, 40' is shown as applied to the concave inside corner of the outer cap part. However there is nothing to stop the adhesive being applied to the inner cap parts 20, 42 instead.

Figure 14:
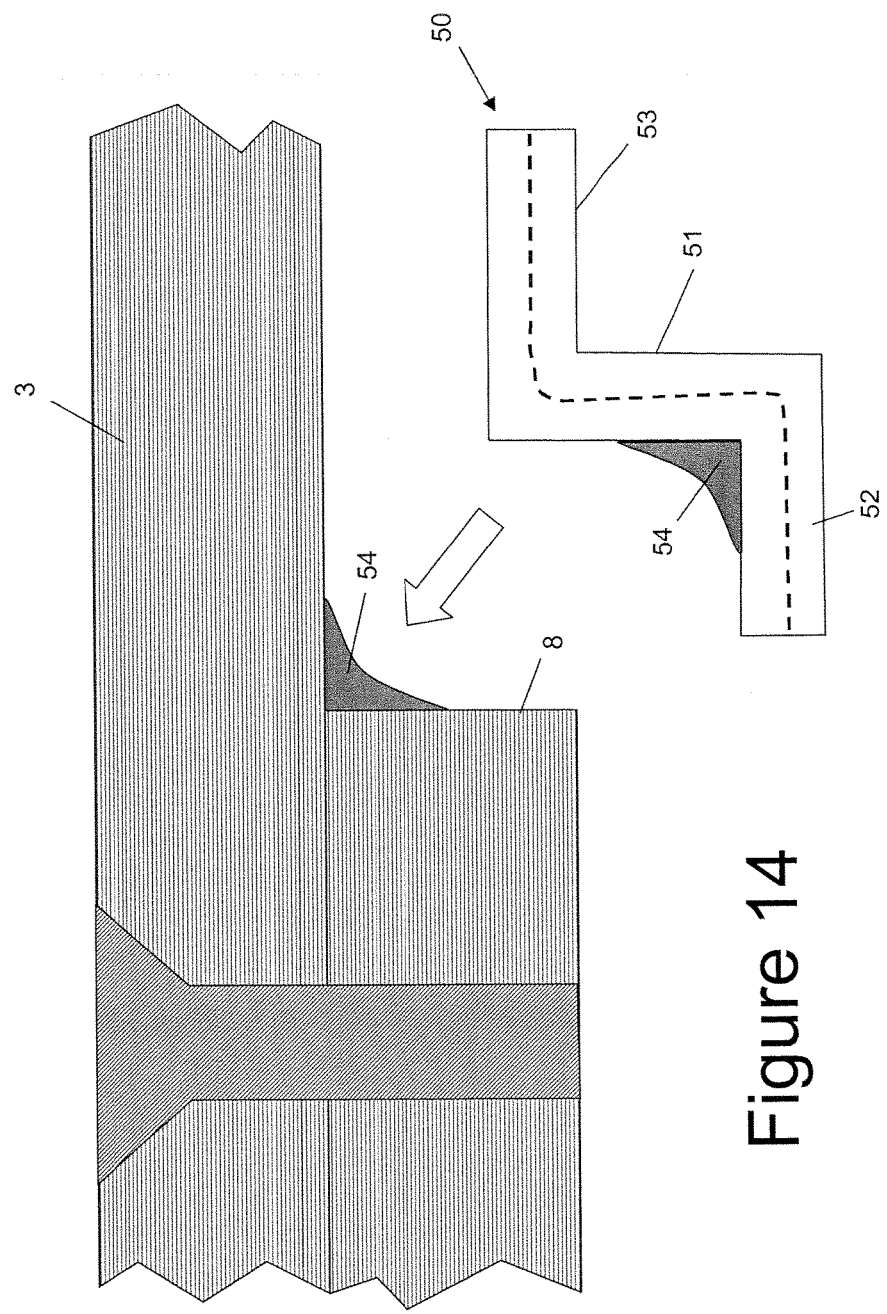
FIGS. 14 and 15 show a third method of attaching a seal to the cut edge.
Figure 15:
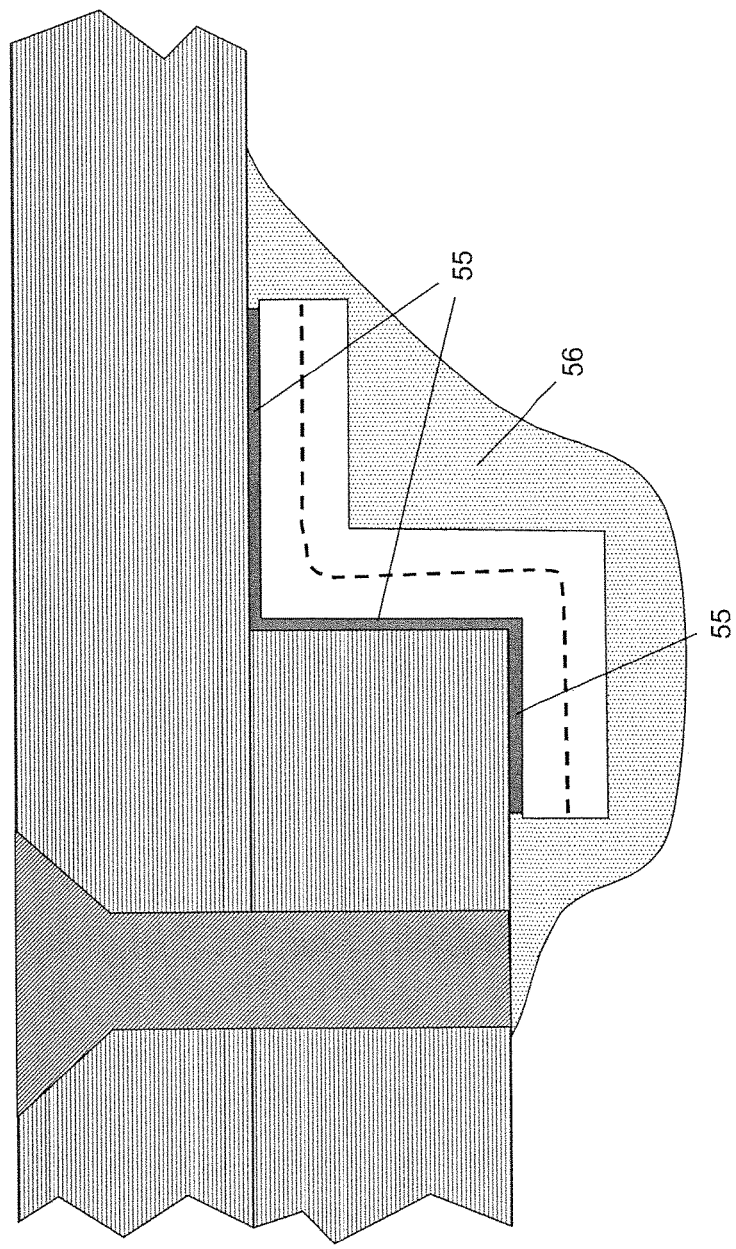

FIGS. 14 and 15 show a third method of attaching a seal to the cut edge 8. In this case the cap is a one part moulded Z-section cap 50, in contrast to the two part cap assemblies used in the embodiments described above. The cap 50 has a web 51 and a pair of flanges 52, 53 which are formed integrally with the web 51. The web 51 is moulded to precisely match any taper in the thickness of the spar cap. Optionally the web 51 may be formed from a softer elastomeric material than the flanges 52, 53.

Strips 54 of wet polysulphide shown in FIG. 14 are applied with a nozzle to the concave corner between the cut edge 8 and the cover 3 and the concave corner where the lower flange 52 of the cap 50 meets the web 51. The cap 50 is then pushed into place, causing the strips 54 to spread out and coalesce to form a thin adhesive layer 55 as shown in FIG. 15. Then pressure is applied to the cap in a series of strokes with a tool so as to squeeze air bubbles out of the adhesive sealant.

Figure 16:
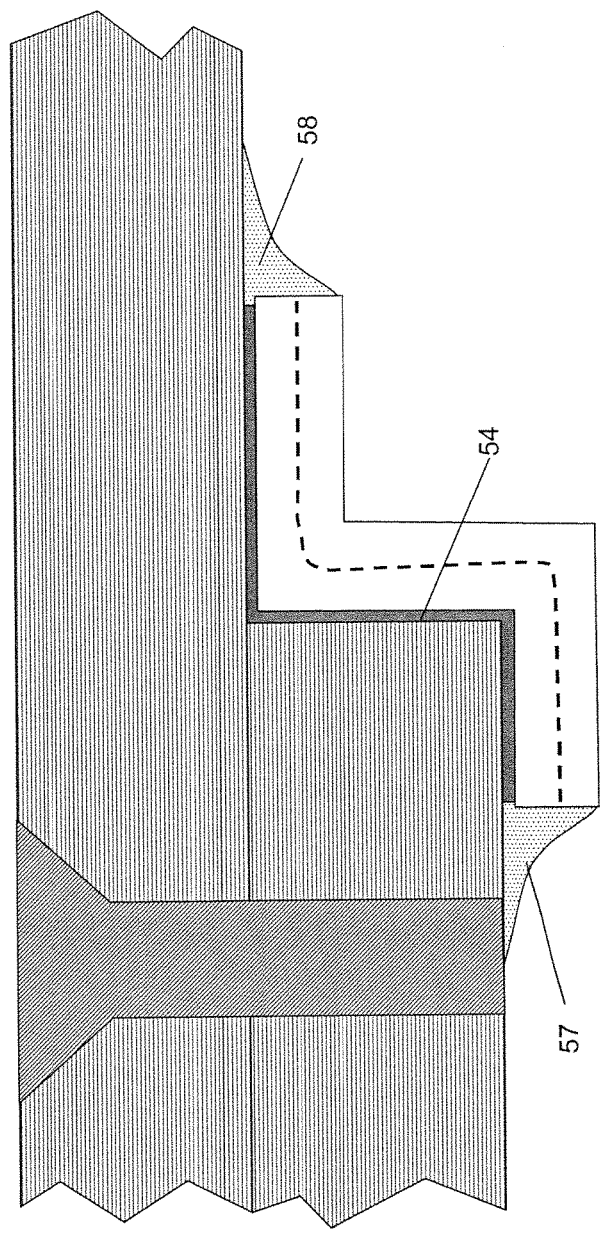
FIG. 16 shows an alternative method of applying sealant encapsulant.

The cap 50 can then optionally be encapsulated in a single large block of sealant 56 as shown in FIG. 15, or with two small fillets of sealant 57, 58 as shown in FIG. 16.

Figure 17:
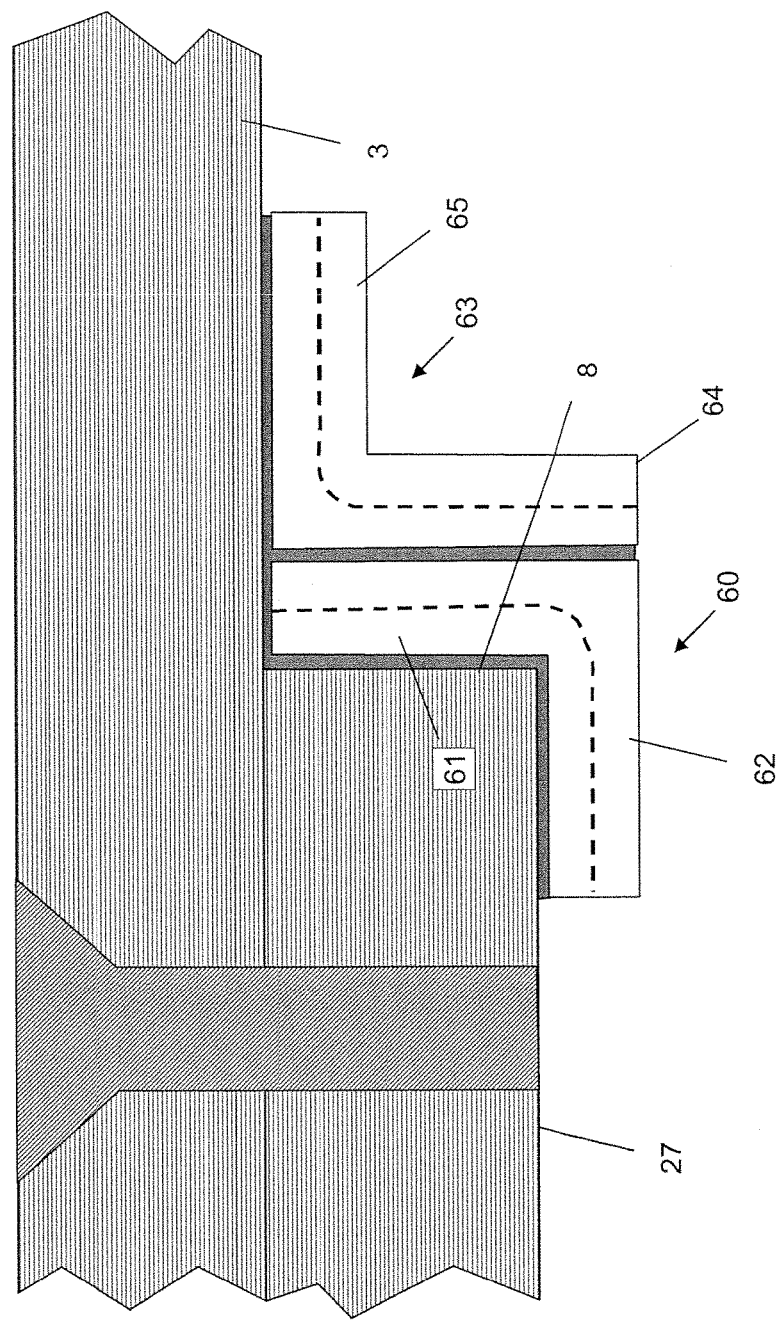
FIG. 17 shows a two-part generally Z-shaped edge seal arrangement in accordance with a further embodiment of the invention.

FIG. 17 shows a two-part generally Z-shaped edge cap assembly in accordance with a further embodiment of the invention. An L-shaped inner cap part 60 is bonded in place with its web 61 bonded to the edge 8 and its flange 62 bonded to the outer face 27 of the spar cap. Optionally the web 61 of the inner cap part may be formed from a softer elastomeric material than the flange 62. An L-shaped outer cap part 63 is then bonded in place with its web 64 bonded to the web 61 of the inner cap part and its flange 65 bonded to the inner face of the cover 3. Optionally the web 64 of the outer cap part may be formed from a softer elastomeric material than the flange 65. The two cap parts are moulded to precisely match any taper in the thickness of the spar cap.

In the embodiments described above, the elastomeric caps are bonded to the cut edge 8 by a wet sealant material which spreads out into a thin layer when the parts are pressed together. However some or all of the wet sealant material may be replaced by a sealant impregnated foam. For instance in FIG. 18 a Z-shaped cap has its web bonded to the cut edge by a sealant impregnated foam layer 70, and its flanges bonded to the cover and spar cap by foam-free wet sealant layers 71, 72. The foam layer 70 is impregnated by immersing it in a bath of liquid sealant. The foam layer 70 is held in compression by the Z-shaped cap, to ensure that voids are not present within the foam. The use of a foam layer is particularly beneficial when the cut edge has an irregular shape.

Figure 19:
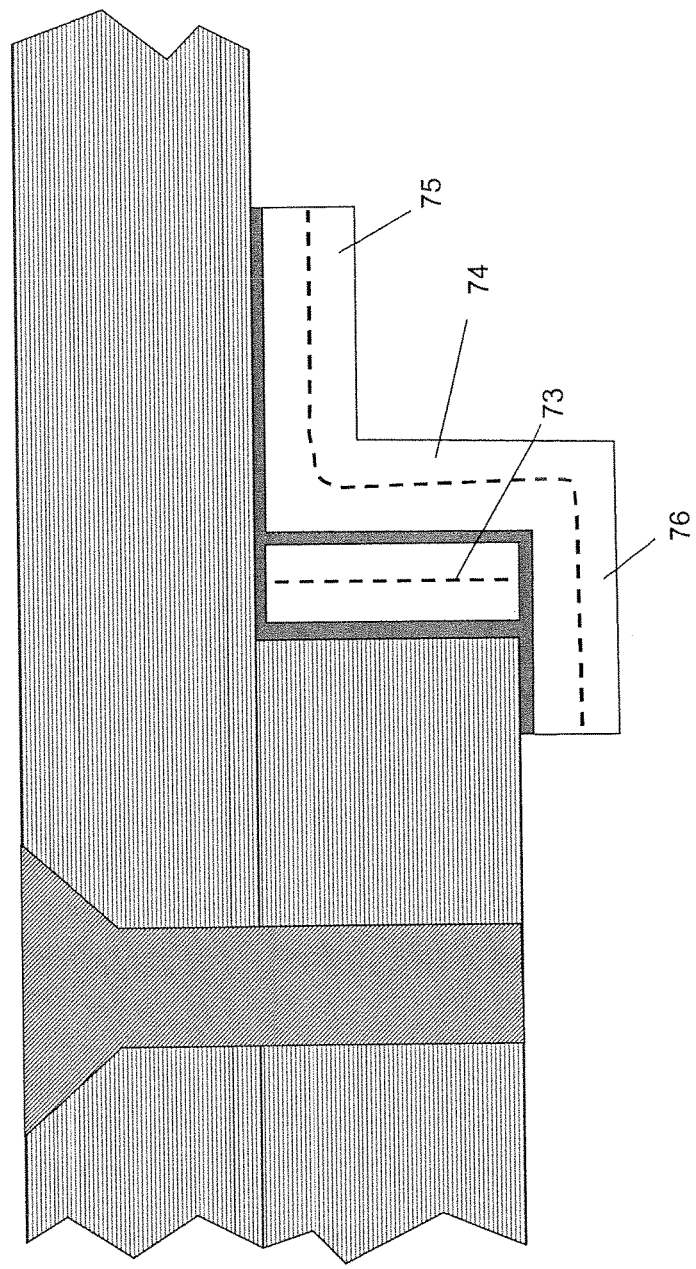
FIG. 19 shows a two-part generally Z-shaped cap arrangement in accordance with a further embodiment of the invention.

FIG. 19 shows a two-part generally Z-shaped cap assembly in accordance with a further embodiment of the invention. The Z-shaped cap assembly is formed in two parts: an inner web strip 73 which is bonded to the cut edge of the spar cap; and an outer cap part with a web 74 bonded to the inner web strip 73; a flange 75 bonded to the inner surface of the cover, and a flange 76 bonded to the inner surface of the spar cap. The web strip 73 can be cut to the correct length after it has been bonded to the cut edge and before the outer cap part is bonded in place.

The outer cap part shields the inner web strip 73 from impact, preventing the inner web strip being dislodged from the cut edge. In particular, if the end of the flange 76 of the outer cap part is knocked, then the flange 76 may peel off but the adhesive bond between the strip 73 and the cut edge will remain intact.

Optionally the web strip 73 may be formed from a softer elastomeric material than the outer cap part.

Figure 18:
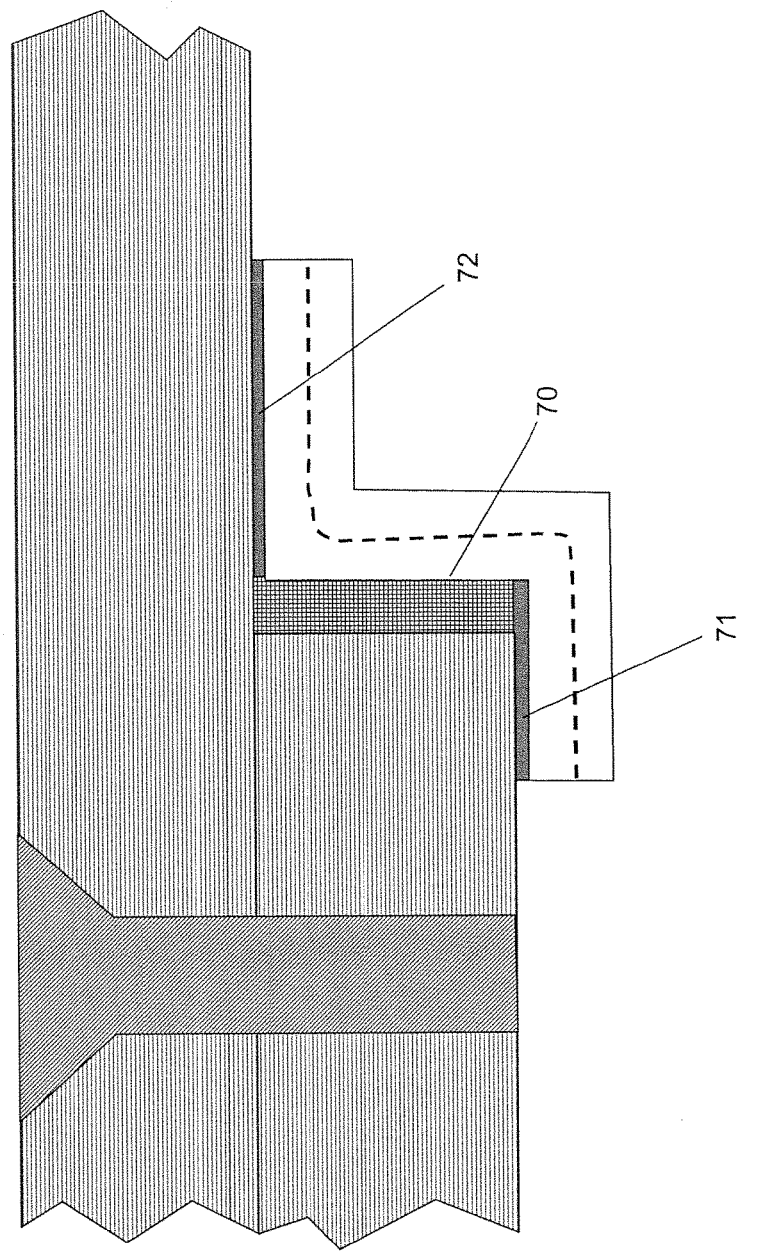
FIG. 18 shows a Z-shaped cap bonded to the cut edge by a sealant impregnated foam layer in accordance with a further embodiment of the invention.

The caps illustrated in FIGS. 17-19 are not encapsulated but optionally they may be encapsulated in a single large block of sealant as shown in FIG. 15, or with two small fillets of sealant as shown in FIG. 16.

A benefit of the elastomeric caps described above is that they can be easily removed and replaced for inspection and repair purposes. Specifically, it is not necessary to dismantle the joint between the cover and the spar flange in order to remove the cap. Also, the use of an elastomeric adhesive sealant in combination with an elastomeric cap makes it easy to peel the cap off using a plastic blade by causing cohesive failure within the adhesive sealant layer.

Although the invention has been described above with reference to one or more preferred embodiments, it will be appreciated that various changes or modifications may be made without departing from the scope of the invention as defined in the appended claims.

The invention claimed is:

1. An aircraft comprising a fibre-reinforced composite structure comprising a cut edge; an elastomeric cap covering the cut edge; and an adhesive sealant bonding the elastomeric cap to the cut edge.

2. The aircraft of claim 1 wherein the adhesive sealant comprises an elastomeric material.

3. The aircraft of claim 1 wherein the elastomeric cap comprises a reinforced elastomer.

4. The aircraft of claim 1 wherein the adhesive sealant is a wet adhesive sealant.

5. The aircraft of claim 4 wherein the wet adhesive sealant impregnates a foam layer between the elastomeric cap and the cut edge.

6. The aircraft of claim 1, wherein a component is joined to the fibre-reinforced composite structure, and wherein the elastomeric cap comprises a web bonded to the cut edge of the fibre-reinforced structure and a flange bonded to the component and extending away from the fibre-reinforced structure.

7. A method of manufacturing the aircraft of claim 6, the method comprising: joining the component to the fibre-reinforced composite structure; bonding the web of the cap to the cut edge of the fibre-reinforced composite structure after the component has been joined to the fibre-reinforced structure; and bonding the flange of the cap to the component after the component has been joined to the fibre-reinforced structure.

8. The method of claim 7 further comprising cutting the web of the cap to size along a corner of the cut edge of the fibre-reinforced composite structure after the web of the cap has been attached to the cut edge.

9. The aircraft of claim 1, wherein the structure comprises a plurality of fibres which terminate at the cut edge.

10. The aircraft of claim 1 wherein the structure comprises a series of plies of fibre-reinforced composite material, each ply comprising a plurality of fibres which terminate at the cut edge.

11. The aircraft of claim 1 wherein the structure comprises a plurality of carbon fibres which terminate at the cut edge.

12. The aircraft of claim 1, wherein the adhesive sealant is made from chemically different material than the elastomeric cap.

13. A joint comprising a fibre-reinforced composite structure with a cut edge; a component joined to the fibre-reinforced composite structure; and a cap with a web bonded to the cut edge of the fibre-reinforced composite structure and a flange bonded to the component and extending away from the fibre-reinforced structure.

14. The joint of claim 13 wherein the web is formed from a softer material than the flange.

15. The joint of claim 13 wherein the fibre-reinforced composite structure has an inner face which faces the component and an outer face which is opposite the inner face, and wherein the web of the cap has a cut edge which is substantially flush with the outer face of the fibre-reinforced composite structure.

16. The joint of claim 13 wherein the cap comprises a web bonded to the cut edge of the fibre-reinforced structure, a first flange bonded to the component and extending away from the fibre-reinforced structure, and a second flange bonded to the fibre-reinforced composite structure.

17. The joint of claim 13 wherein the web of the cap is formed integrally with the flange of the cap.

18. The joint of claim 13 wherein the cap comprises a cap assembly with an inner cap part bonded to the cut edge of the fibre-reinforced structure; and an outer cap part with a web bonded to the web of the inner cap part and a flange bonded to the fibre-reinforced composite structure.

19. The joint of claim 18 wherein the cap comprises a cap assembly with an inner cap part and an outer cap part, the inner cap part having a web bonded to the cut edge of the fibre-reinforced structure and a first flange bonded to the component and extending away from the fibre-reinforced structure; the outer cap part comprising a web bonded to the web of the inner cap part and a second flange bonded to the fibre-reinforced composite structure.

20. The joint of claim 18 wherein at least the part of the inner cap part which is bonded to the cut edge is formed from a softer material than the flange of the outer cap part.

21. The joint of claim 13, wherein the fibre-reinforced composite is made from chemically different material than the cap and the cap comprises the web and the flange.

22. A fibre-reinforced composite structure comprising a cut edge; an elastomeric cap covering the cut edge; and an adhesive sealant bonding the elastomeric cap to the cut edge, wherein the structure comprises a plurality of fibres which terminate at the cut edge, and wherein the structure comprises a matrix material between the fibres which is more electrically resistive than the fibres.

23. A method of inhibiting edge glow in a fibre-reinforced composite structure comprising a cut edge, the method comprising bonding an elastomeric cap to the cut edge of an aircraft with an adhesive sealant to cover the cut edge.

24. The method of claim 23 further comprising applying pressure to the elastomeric cap in a series of strokes so as to squeeze air bubbles out of the adhesive sealant.

25. The method of claim 23, wherein the structure comprises a plurality of fibres which terminate at the cut edge.

26. The method of claim 25 wherein the structure comprises a series of plies of fibre-reinforced composite material, each ply comprising a plurality of fibres which terminate at the cut edge.

27. The method of claim 25 wherein the structure comprises a matrix material between the fibres which is more electrically resistive than the fibres.

28. The method of claim 25 wherein the structure comprises a plurality of carbon fibres which terminate at the cut edge.

29. A fuel tank comprising a fibre-reinforced composite structure comprising a cut edge; an elastomeric cap covering the cut edge; and an adhesive sealant bonding the elastomeric cap to the cut edge.

30. The fuel tank of claim 29, wherein the fuel tank is an aircraft fuel tank.

\* \* \* \* \*